United States Patent
Sakata

(10) Patent No.: US 7,764,693 B2
(45) Date of Patent: Jul. 27, 2010

(54) RADIO COMMUNICATION SYSTEM, BASE STATION CONTROL EQUIPMENT, RADIO TERMINAL, AND RADIO COMMUNICATION METHOD

(75) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 1154 days.

(21) Appl. No.: 11/361,891

(22) Filed: Feb. 24, 2006

(65) Prior Publication Data

US 2006/0193276 A1 Aug. 31, 2006

(30) Foreign Application Priority Data

Feb. 25, 2005 (JP) .............................. 2005-051139

(51) Int. Cl.
*H04L 12/28* (2006.01)
(52) U.S. Cl. ..................... 370/394; 370/474; 714/746; 714/748; 714/749; 714/750
(58) Field of Classification Search ................. 370/238, 370/252, 463, 465, 394, 474; 714/746, 748, 714/749, 750
See application file for complete search history.

(56) References Cited

U.S. PATENT DOCUMENTS

| 6,215,774 | B1 | 4/2001 | Knauerhase et al. |
| 6,473,404 | B1 | 10/2002 | Kaplan et al. |
| 6,757,245 | B1 | 6/2004 | Kuusinen et al. |

FOREIGN PATENT DOCUMENTS

| EP | 0 522 211 A1 | 1/1993 |
| JP | 8-317452 A | 11/1996 |
| JP | 2003-9224 | 3/1999 |
| JP | 2000-184430 A | 6/2000 |
| JP | 2004-080228 A | 3/2004 |
| WO | WO 01/91375 A2 | 11/2001 |

OTHER PUBLICATIONS

Japanese Official Action dated Apr. 21, 2010 together with English language translation.

*Primary Examiner*—Ajit Patel
*Assistant Examiner*—Khai M Nguyen
(74) *Attorney, Agent, or Firm*—Scully, Scott, Murphy & Presser, P.C.

(57) ABSTRACT

A radio communication system which automatically selects a communication path having a higher speed is provided when a plurality of communication paths having a different speed from each other are available for data transmission between the radio terminal and the base station control equipment. The radio terminal receives a data frame and sends back an ACK signal for the data frame via the communication path through which the data frame has been received. At this time, the radio terminal acquires data of the frame with a sequence number having received at the first time, and if the frame with the same sequence number is received later, the frame is discarded. However, the ACK signal is sent back in respective cases. The base station control equipment transmits a first data frame to the radio terminal via the plurality of communication paths and transmits subsequent data frames to the radio terminal via one communication path through which the ACK signal for the first data frame has arrived the earliest.

14 Claims, 6 Drawing Sheets

RADIO COMMUNICATION SYSTEM, BASE STATION CONTROL EQUIPMENT, RADIO TERMINAL, AND RADIO COMMUNICATION METHOD

BACKGROUND OF THE INVENTION

1. Field of the Invention

The present invention relates to a radio communication system, a base station control equipment, a radio terminal, and a radio communication method which performs communication via a radio channel, and more particularly to those which can perform communication among channels or systems having a different communication speed.

2. Description of the Related Art

In recent years, radio communication system represented by mobile communication, which does not require laying down wired cables, has been used as a communication system in various environments. Among them is mobile communication system using CDMA (Code Division Multiple Access) technology. In the mobile communication system using CDMA technology, communication is performed by using a plurality of radio signals as communication channels, which are created by spreading one frequency band by a plurality of codes mathematically orthogonal to each other. In an overlapped area of the communication areas by a plurality of radio base stations, as a handover operation, a mobile station establishes path connection with each of the radio base stations of the communication area and thereby performs communication. More specifically, a mobile station transmits/receives data to and from multiple radio base stations using the same frequency and speed via a plurality of paths.

In recent years, radio communication techniques using wireless LAN have also been used. In the radio communication using the wireless LAN, a radio terminal accesses an access point arranged at a predetermined position and thereby performs radio communication. In this case, communication is performed at a communication speed different from that of the above described mobile communication system using the CDMA technology.

The two radio communication systems described above performs radio communication at a different communication speed from each other. Accordingly, when performing communication while moving, a radio terminal cannot perform seamless changeover between the two radio communication systems.

In Japanese Patent Laid-Open No. 2003-9224, there is disclosed a technique of radio communication system which has two base stations having a different communication speed from each other. In this technique, a path control equipment, which selects one of two communication networks each connected to the each base station, is provide, and performs communication between the base station and a radio terminal via the communication network selected by the path control equipment. In the radio communication system disclosed in Japanese Patent Laid-Open No. 2003-9224, control information, which indicates whether high speed data transmission from the base station can be acceptable or not to the radio terminal, is sent from the radio terminal. And, one is selected from among the two communication networks based on the control information. Accordingly, it is possible for the radio terminal to communicate with communication networks having a different communication speed each other.

In the radio communication system disclosed in Japanese Patent Laid-Open No. 2003-9224, however, the control information must be sent from the radio terminal prior to selecting one of communication networks. Consequently, under the radio signal propagation environment is not good and when the radio signal state of a high speed channel frequently deteriorates, the processing in the radio terminal may become complex.

SUMMARY OF THE INVENTION

The present invention has been achieved in view of the above-mentioned problem associated with the conventional art and has an object of providing a radio communication system, abase station control equipment, a radio terminal, and a radio communication method which makes it possible to perform communication by channels or systems having a different communication speed without making the processing in a radio terminal complex.

To achieve the above object, the present invention comprises a radio terminal without making the processing complex and a base station control equipment, which transmits and receives data to and from the radio terminal via at least one communication path selected from among a plurality of communication paths having a different communication speed from each other.

The radio terminal receives a data frame via at least one communication path selected from among a plurality of communication paths having a different communication speed from each other, and sends back an ACK signal for the data frame via the communication path through which the data frame has been received. At this time, the radio terminal acquires data of the frame with a sequence number having received at the first time, and if the frame with the same sequence number is received later, the frame is discarded. However, the ACK signal is sent back in respective cases.

The base station control equipment transmits a first data frame to the radio terminal via the plurality of communication paths and transmits subsequent data frames to the radio terminal via one communication path through which the ACK signal for the first data frame has arrived the earliest.

Accordingly, when data is transmitted and received between the radio terminal and the base station control equipment via a plurality of communication paths having a different communication speed from each other, one communication path having a higher communication speed is automatically selected, because the data frame through the higher communication speed path is received at the radio terminal faster than the lower communication speed path and the corresponding ACK signal is also received at the base station control equipment faster than the other.

BRIEF DESCRIPTION OF THE DRAWINGS

Exemplary features and advantages of the present invention will become apparent from the following detailed description when taken with accompanying drawings in which.

DETAILED DESCRIPTION OF THE PREFERRED EMBODIMENTS

An embodiment of the present invention will be described below with reference to the accompanying drawings.

Figure 1:
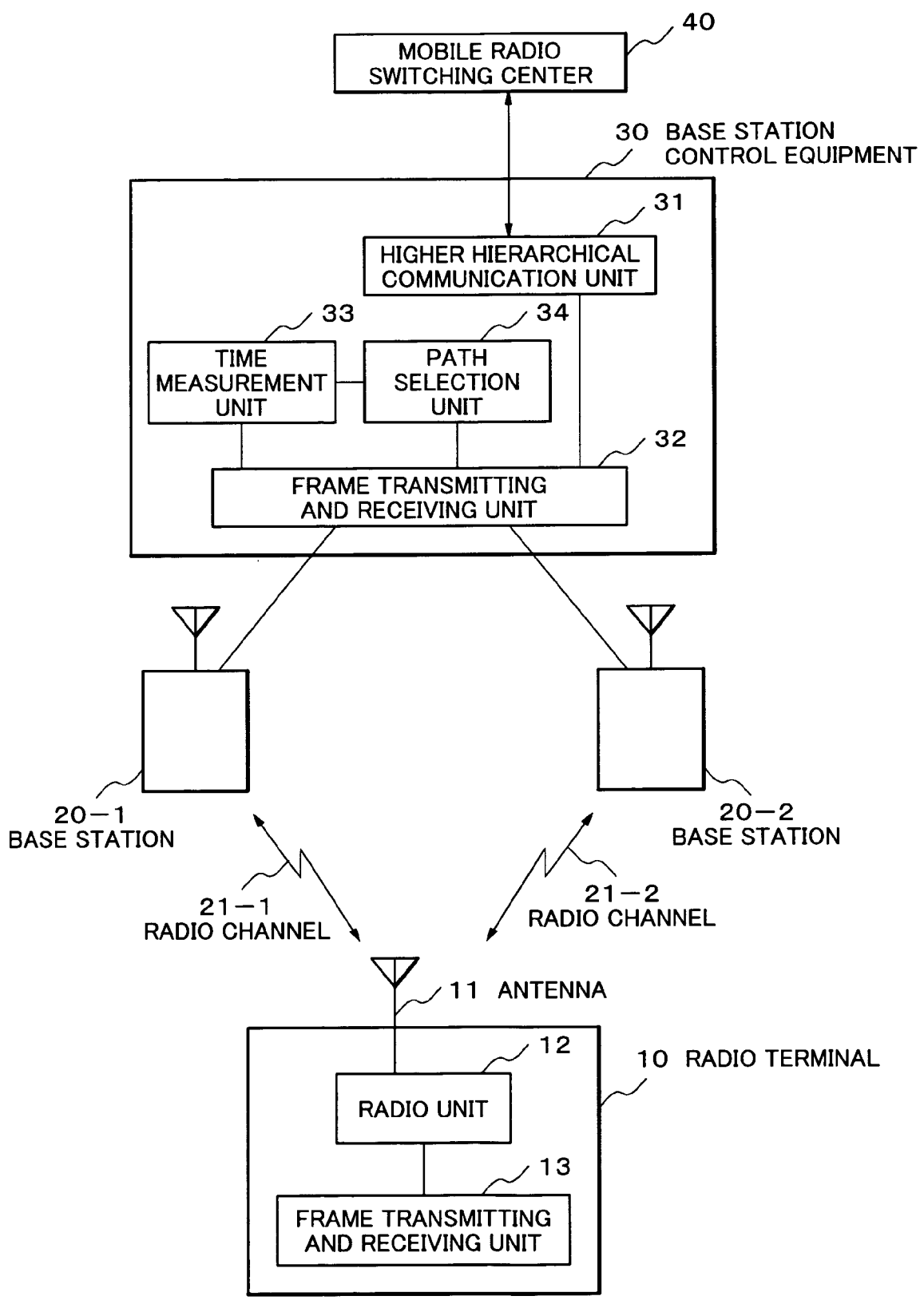
FIG. 1 is a system block diagram showing one embodiment of a radio communication system according to the present invention.

FIG. 1 is a system block diagram showing one embodiment of a radio communication system according to the present invention.

As shown in FIG. 1, the radio communication system according to the present invention comprises a radio terminal 10 capable of transmitting and receiving data via two radio channels 21-1 and 21-2, a base station 20-1 transmitting and receiving data to and from the radio terminal 10 via the radio channel 21-1, a base station 20-2 transmitting and receiving data to and from the radio terminal 10 via the radio channel 21-2, and a base station control equipment 30 which is connected to a higher hierarchy equipment, such as a mobile radio switching center 40, and the base stations 20-1 and 20-2, and can control the base stations 20-1 and 20-2 and transmit and receive data to and from the radio terminal 10 via the base stations 20-1 and 20-2 and the radio channels 21-1 and 21-2. The communication speed of the radio channel 21-1 is different from that of the radio channel 21-2; the communication speed of the radio channel 21-2 is higher than that of the communication speed of the radio channel 21-1. In FIG. 1 of the present embodiment, there are shown only two base stations 20-1 and 20-2 and one radio terminal 10. However, the present invention is not limited thereto; there may be a plurality of base stations and one or more radio terminals 10.

The radio terminal 10 includes an antenna 11, a radio unit 12 and a frame transmitting and receiving unit 13. The antenna 11 and radio unit 12 receive data transmitted from the base stations 20-1 and 20-2 as radio signals, and at the same time transmit data destined for the base stations 20-1 and 20-2 as radio signals. The frame transmitting and receiving unit 13 serves to transmit and receive data transmitted and received via the antenna 11 and radio unit 12 on a sequentially-numbered frame basis. Also, the frame transmitting and receiving unit 13 serves to acquire data from earliest arriving one from among frames with the same sequence number received via the radio channels 21-1 and 21-2 and transmits an ACK (Acknowledgement) signal for the frame reception. When a frame having the same sequence number as that of the frame already received is received, the frame transmitting and receiving unit 13 discards the frame and returns the ACK signal for the discarded frame.

Practically, the radio terminal 10 is provided with a display unit having displayed thereon information, an audio output unit used to output audio information, an operation unit used to receive information, and so on. However, these units are not directly related to the present invention, and hence a drawing thereof is omitted.

The base station control equipment 30 includes a higher hierarchical communication unit 31, a frame transmitting and receiving unit 32, a time measurement unit 33 and a path selection unit 34. The higher hierarchical communication unit 31 communicates with the higher hierarchy equipment such as the mobile radio switching center 40. The frame transmitting and receiving unit 32 serves to transmit and receive frames to and from the radio terminal 10 via the base stations 20-1 and 20-2. The time measurement unit 33 serves to measure a length of time that has elapsed since a frame was transmitted from the frame transmitting and receiving unit 32. The path selection unit 34 serves to selects one or two communication paths to the radio terminal 10 based on the frame received by the frame transmitting and receiving unit 32 and the length of time measured by the time measurement unit 33.

The path selection unit 34 performs two processing for the communication path selection described below. The first selection processing is executed at the time of starting frame transmission to the radio terminal 10 or when the ACK signal for a transmitted frame is not received by the frame transmitting and receiving unit 32 even after a predetermined length of time measured by the time measurement unit 33 has elapsed since the frame was transmitted to the radio terminal 10. In this case, as the communication path for subsequent frames to be transmitted from the frame transmitting and receiving unit 32, two communication paths are selected. One communication path includes the base station 20-1 and the radio channel 21-1 and another communication path includes the base station 20-2 and the radio channel 21-2. The second selection processing is executed under two communication paths being established by the first selection processing as described, and when the ACK signal for a frame is received through one of communication paths before a predetermined length of time measured by the time measurement unit 33 elapses after transmitting the frame to the radio terminal 10. In this case, as the communication path for subsequent frames to be transmitted from the frame transmitting and receiving unit 32, the communication path through which an earlier arriving ACK signal has been transmitted is selected.

The time measurement unit 33 calculates and sets the time interval for a retransmission timer, which counts a length of time from the frame transmission to the reception of the ACK signal. If the time interval has elapsed before receiving the ACK signal, it is detected as a time-out of frame transmission and reception, and the same frame as before is transmitted again as a retransmission operation. The time measurement unit 33 calculates the time interval for the retransmission timer based on the measurement results of a length of time taken from transmitting the frame to receiving the ACK signal for several previous frame transmissions to the radio terminal 10. When the time-out is detected in the frame transmission, new time interval for the retransmission timer to be subsequently used is set longer than the current time interval by which the retransmission timer has timed out.

A radio communication method for the radio communication system having the configuration described above will be described with reference to the accompanying flowcharts.

First the operation of the radio terminal 10 will be described.

Figure 2:
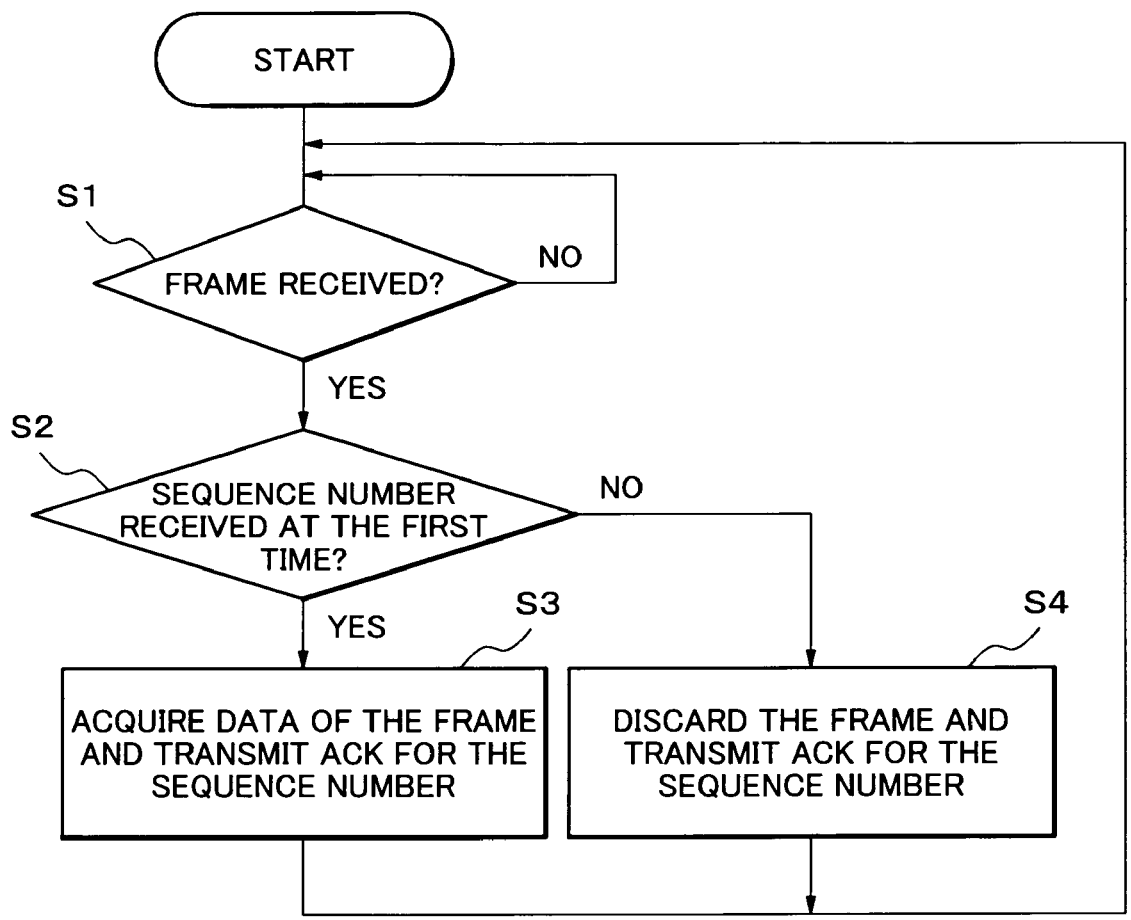
FIG. 2 is a flowchart for explaining the operation of a radio terminal in the radio communication system shown in FIG. 1.

FIG. 2 is a flowchart for explaining the operation of the radio terminal 10 in the radio communication system shown in FIG. 1.

When the frame, which has been transmitted from the base station control equipment 30 via the base station 20-1 and radio channel 21-1, or via the base station 20-2 and radio channel 21-2, is received by the frame transmitting and receiving unit 13 (step S1), the radio terminal 10 detects the sequence number attached to the received frame, and confirms whether or not the received sequence number is the first one ever received in this communication (step S2). If so, the radio terminal 10 acquires the frame data, and transmits the ACK signal including the sequence number attached to the frame via the communication path constituted of the radio channel and base station through which the frame has been transmitted (step S3).

When the sequence number attached to the frame received in step S1 is already received one, the radio terminal 10 discards the frame, and transmits the ACK signal including the sequence number attached to the frame via the communication path constituted of the radio channel and base station through which the frame has been transmitted (step S4).

Like this manner, the radio terminal 10 receives two frames each having the same sequence number via different communication paths, and acquires data of frame which has been received earlier than the other and discards the other frame which has arrived later. However, the radio terminal 10 transmits the respective ACK signals for each of frames through respective communication paths.

Next, the operation of the base station control equipment 30 will be described.

Figure 3:
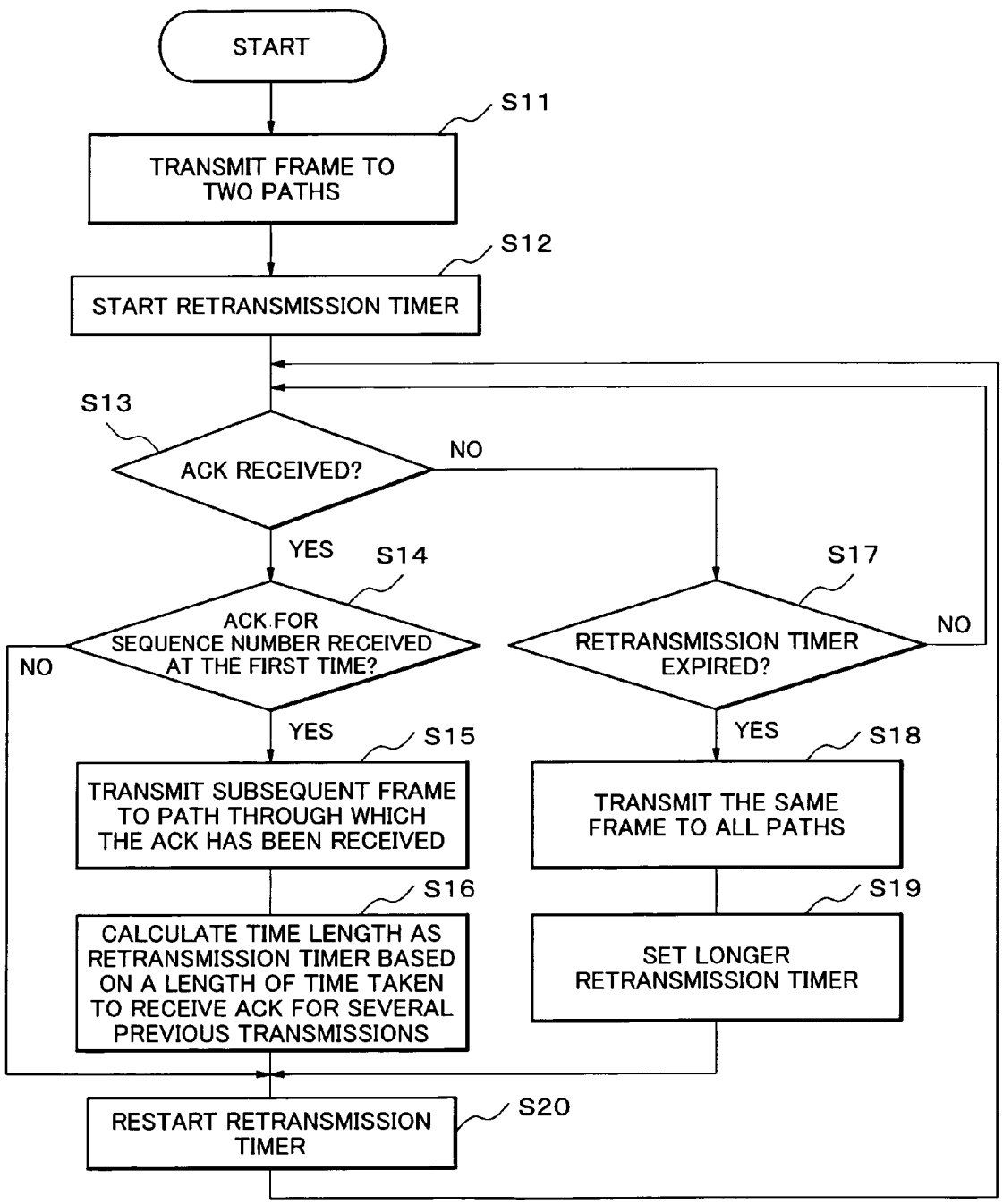
FIG. 3 is a flowchart for explaining the operation of a base station control equipment in the radio communication system shown in FIG. 1.

FIG. 3 is a flowchart for explaining the operation of the base station control equipment 30 in the radio communication system shown in FIG. 1.

First, when starting frame transmission to the radio terminal 10, two communication paths, i.e., one constituted of the base station 20-1 and radio channel 21-1 and one constituted of the base station 20-2 and radio channel 21-2 are selected by the path selection unit 34, whereby a frame is transmitted from the frame transmitting and receiving unit 32 to the base station 20-1 and also to the base station 20-2 (step S11). At this time, the retransmission timer of the time measurement unit 33 is initiated to measure a length of time taken to receive the ACK signal after transmitting the frame (step S12).

Thereafter, when the ACK signal transmitted by the radio terminal 10, as described before, is received by the base station control equipment 30 via the communication path constituted of the radio channel 21-1 and base station 20-1 or via the communication path constituted of the radio channel 21-2 and base station 20-2 (step S13: YES), the frame transmitting and receiving unit 32 detects the sequence number included in the ACK signal and confirms whether or not the sequence number in the ACK signal is the first one ever received in this communication (step S14). If so (step S14: YES), then the communication path through which the ACK signal has been transmitted is selected by the path selection unit 34 as the communication path for transmitting the subsequent frames (step S15). When the sequence number contained in the ACK signal received in step S13 is already received one (step S14: NO), no processing is performed.

Like this manner, a frame was transmitted from the base station control equipment 30 via two communication paths first, and then, one of communication paths, through which the ACK signal sent back from the radio terminal 10 has arrived earlier, is selected as the communication path for transmitting subsequent data frames from the base station control equipment 30 to the radio terminal 10. Accordingly, the frame and the corresponding ACK signal transmitted via the communication path having a higher-speed transmission capability have arrived earlier. Thus, the higher-speed communication path is automatically selected as the communication path for transmission of the subsequent frames, and this means that the communication path between the base station control equipment 30 and the radio terminal 10 is automatically switched from the lower-speed communication path to the higher-speed one.

The time measurement unit 33 calculates and sets the time interval for the retransmission timer based on a length of time taken to receive the ACK signal for several previous frame transmissions (step S16).

Meanwhile, when the ACK signal for the frame transmitted from the base station control equipment 30 is not received within the predetermined time interval defined by the retransmission timer (step S17: YES), the path selection unit 34 selects both the two communication paths (one constituted of the base station 20-1 and radio channel 21-1 and one constituted of the base station 20-2 and radio channel 21-2) to transmit the same frame from the frame transmitting and receiving unit 32 to the base stations 20-1 and 20-2, which is so called the frame retransmission (step S18).

Whenever the frame retransmission has occurred, the time measurement unit 33 sets longer time interval for the retransmission timer in an incremental manner. Accordingly, the time interval of the retransmission timer is automatically changed to an optimum value for the communication between the base station control equipment 30 and the radio terminal 10 to be performed via the lower-speed communication path (step S19).

Thereafter, the time measurement unit 33 measures the time interval from the frame transmission to the ACK signal reception by renewed retransmission timer (step S20).

Next, the operation of changeover between the communication path constituted of the base station 20-1 and radio channel 21-1 and the communication path constituted of the base station 20-2 and radio channel 21-2 will be described with reference to FIG. 4.

Figure 4:
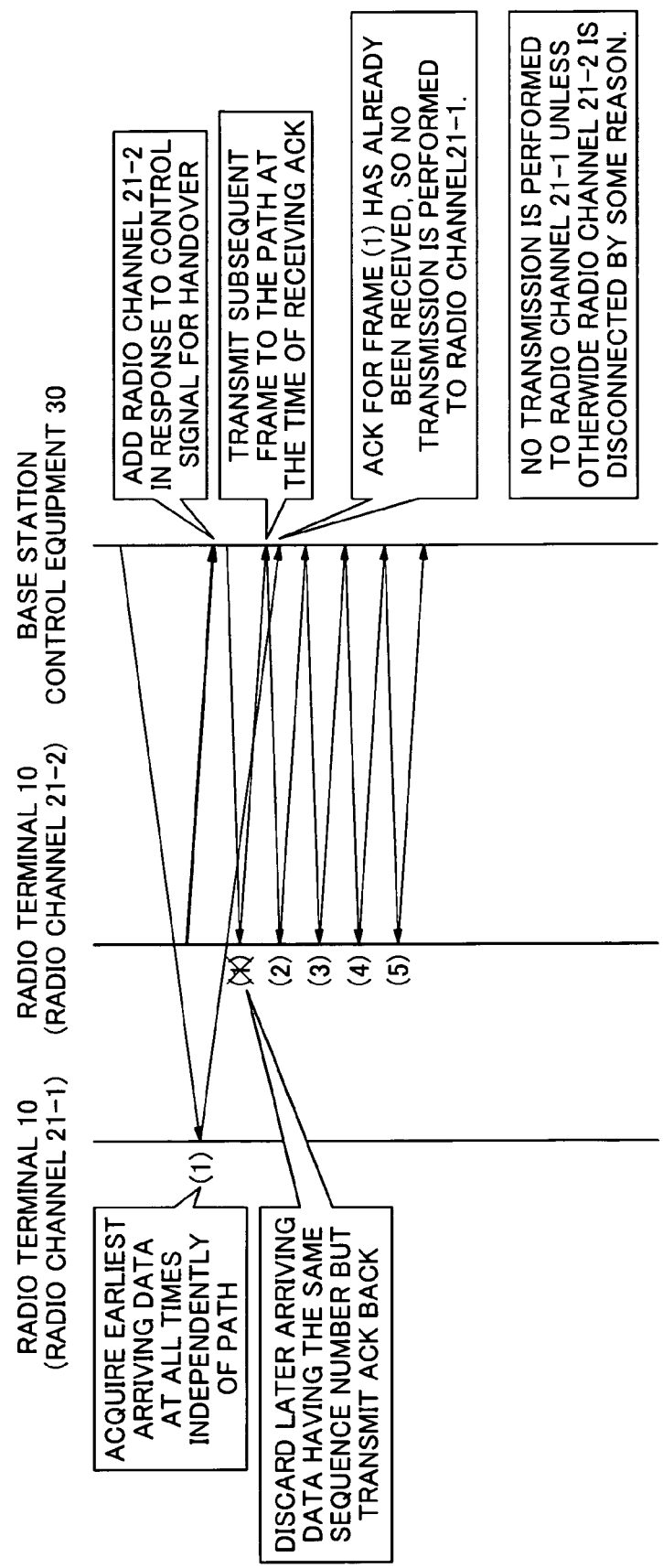
FIG. 4 is a sequence chart in the radio communication system shown in FIG. 1 when a higher-speed radio channel is connected while communication is under way via a lower-speed radio channel.

FIG. 4 is a sequence chart in the radio communication system shown in FIG. 1 when the higher-speed radio channel 21-2 becomes available for use while the current communication is being performed via the lower-speed radio channel 21-1.

In the base station control equipment 30, after frame (1) is transmitted to the radio terminal 10 via the communication path constituted of the base station 20-1 and radio channel 21-1, another connection using the radio channel 21-2 is established in response to the control signal for the conventional technique such as the handover operation. In this case, the frame transmitted via the communication path constituted of the base station 20-2 and radio channel 21-2 is the same as one already transmitted to the radio terminal 10 when a connection to the radio channel 21-1 was made.

When receiving frame (1) via the base station 20-1 and radio channel 21-1, the radio terminal 10 acquires data of frame (1) received and at the same time transmits the ACK signal for frame (1) to the base station control equipment 30 via the base station 20-1 and radio channel 21-1. Thereafter the radio terminal 10 discards frame (1) received via the base station 20-2 and radio channel 21-2, and at the same time transmits the ACK signal for frame (1) to the base station control equipment 30 via the base station 20-2 and radio channel 21-2.

The radio channel 21-2 has a higher communication speed than the radio channel 21-1. Accordingly, the base station control equipment 30 receives the ACK signal transmitted via the base station 20-2 and radio channel 21-2 earlier than that transmitted via the base station 20-1 and radio channel 21-1. Thereafter the ACK signal is received via the base station 20-1 and radio channel 21-1, but the sequence number contained in the ACK signal has already been received by the base station control equipment 30. Consequently, the ACK signal is discarded, and no processing is performed.

The base station control equipment 30 selects the communication path constituted of the base station 20-2 and radio channel 21-2 through which the ACK signal has been transmitted earlier, and transmits subsequent frame (2) via the radio channel 21-2.

Thereafter, frames (3) to (5) are similarly transmitted from the base station control equipment 30 to the radio channel 10 via the base station 20-2 and radio channel 21-2, and respective ACK signals for each of frames are transmitted from the radio terminal 10 to the base station control equipment 30 via the base station 20-2 and radio channel 21-2. In this manner, the changeover from the lower-speed radio channel 21-1 to the higher-speed radio channel 21-2 is automatically performed for the communication between the base station control equipment 30 and the radio terminal 10.

Figure 5:
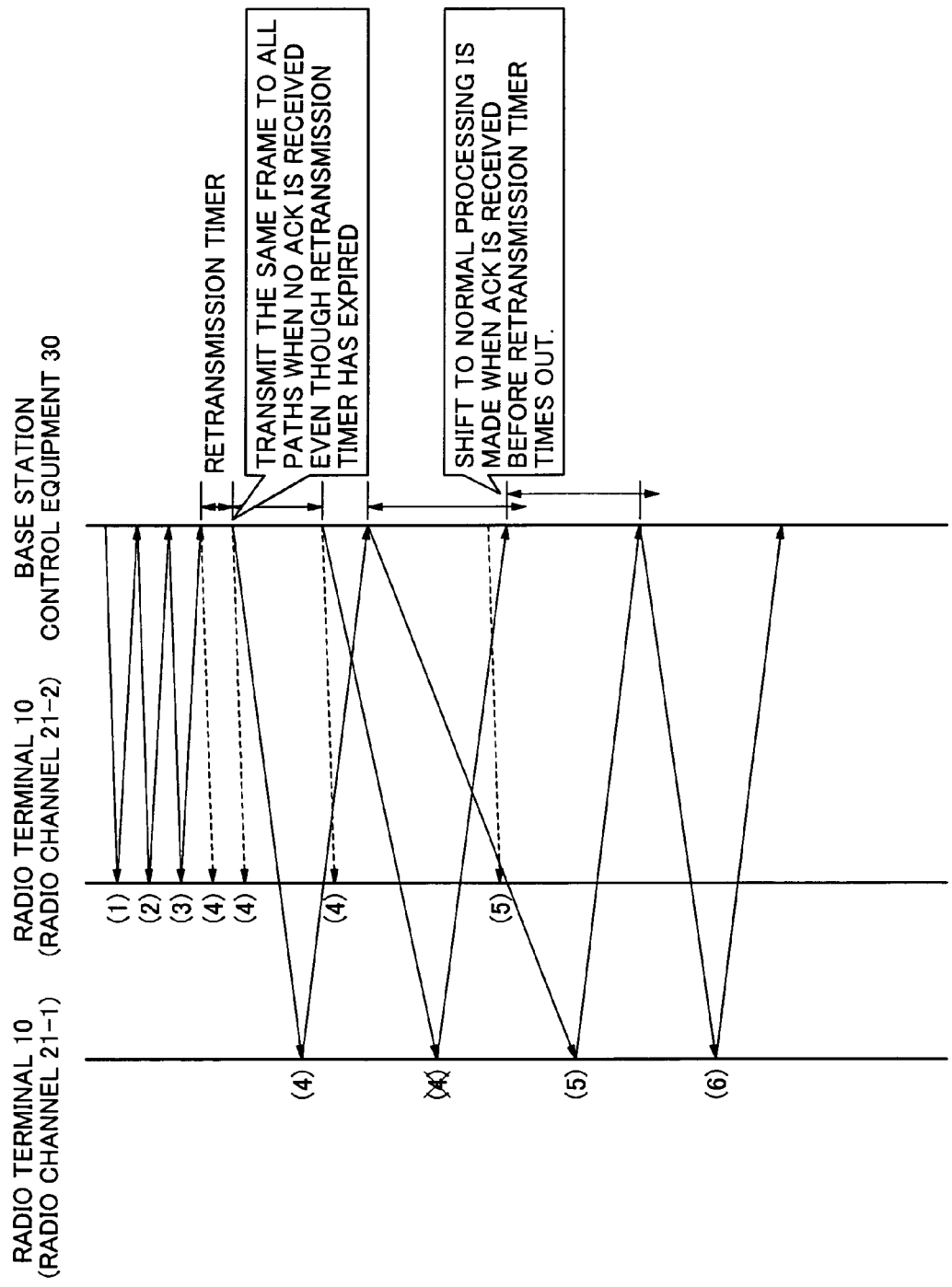
FIG. 5 is a sequence chart in the radio communication system shown in FIG. 1 when the higher-speed radio channel is disconnected while the radio channels are in a connected state.

FIG. 5 is a sequence chart in the radio communication system shown in FIG. 1 when the higher-speed radio channel 21-2 is disconnected by some reason while the radio channels 21-1 and 21-2 are in a connected state.

Assume that the base station control equipment 30 has already transmitted frames (1) to (3) to the radio terminal 10 via the higher-speed radio channel 21-2 and the base station 20-2, but thereafter the radio signal propagation via the higher-speed radio channel 21-2 deteriorates and thus the higher-speed radio channel 21-2 is disconnected. In this case, frame (4) transmitted from the base station control equipment 30 does not reach the radio terminal 10 and thus no ACK signal for frame (4) is transmitted. Consequently, the length of time measured as the retransmission time by the time measurement unit 33 expires the predetermined time. The time measurement unit 33 calculates the length of time as the retransmission timer based on the length of time taken to receive respective ACK signals for several previous frame transmissions, and thus the length of time as the retransmission timer is set shorter for the higher-speed channel and set longer for the lower-speed channel.

After setting the length of time measured by the time measurement unit 33 as the retransmission timer, the base station control equipment 30 transmits previous frame (4) to the radio terminal 10 via both the communication paths (one constituted of the base station 20-1 and radio channel 21-1 and one constituted of the base station 20-2 and radio channel 21-2). The ACK signal for the frame transmitted can not be received via the higher-speed radio channel 21-2, but can be received via the lower-speed radio channel 21-1. In this case, if the retransmission timer set by the time measurement unit 33 remains to have a small value set for the higher-speed radio channel 21-2, the ACK signal transmitted via the lower-speed radio channel 21-1 becomes the time-out at all times and thus retransmissions of the same frame pile up. Accordingly, the length of time as the retransmission timer is set longer according to the number of occurrences of time-outs. Particularly, in order to reach the length of time as the retransmission timer for the lower-speed radio channel 21-1 as early as possible, it is necessary to consider the difference of channel speed. For example, when the channel of 100 kbps and the channel of 100 Mbps are used, the length of time as the retransmission timer is set longer 10 times for each time-out; when the channel of 1 Mbps and the channel of 10 Mbps are used, the length of time as the retransmission timer is set longer three times for each time-out. After frame retransmission is repeated several times, the length of time as the retransmission timer is adapted for the lower-speed radio channel 21-1, and the frame transmission and reception processing shifts to the normal processing via the lower-speed radio channel 21-1.

Figure 6:
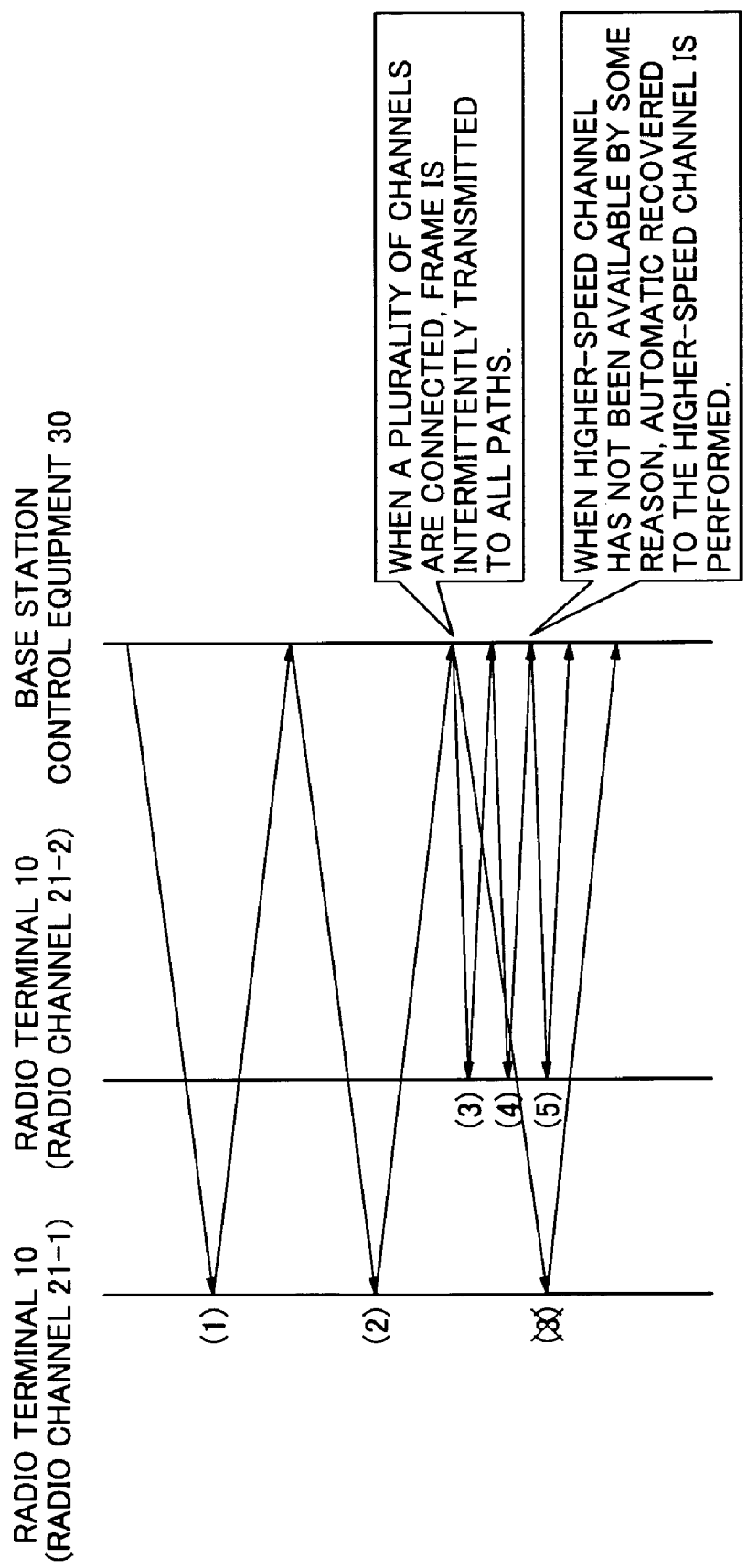
FIG. 6 is a sequence chart in the radio communication system shown in FIG. 1 when while the lower-speed radio channel has been selected due to some reason, it becomes possible to use the higher-speed radio channel.

FIG. 6 is a sequence chart in the radio communication system shown in FIG. 1 when it becomes possible to use the higher-speed radio channel 21-2 while the lower-speed radio channel 21-1 has been selected due to some reason.

For example, when the radio terminal 10 is moving and the distance between the radio terminal 10 and the base station 20-2 becomes far enough to disconnect the communication, the processing explained by FIG. 5 is performed. However, there may also be a case in which the radio signal propagation via the higher-speed radio channel 21-2 may deteriorate temporarily due to geographical environment or the like depending on the positional relationship between the radio terminal 10 and the base station 20-2, causing a short interruption or the like which temporarily cripples the communication via the higher-speed radio channel 21-2. In this case, it is preferable to use the higher-speed radio channel 21-2 again when the positional relationship between the radio terminal 10 and the base station 20-2 is improved and it becomes possible to use the higher-speed radio channel 21-2 again.

Thus, in a case where the base station control equipment 30 is in a state where its connection to the radio terminal 10 is made via a plurality of the radio channels 21-1 and 21-2, while transmitting and receiving the frames only via one communication path, the base station control equipment 30 intermittently transmits the frame to the radio terminal 10 via both the communication paths (one constituted of the base station 20-1 and radio channel 21-1 and one constituted of the base station 20-2 and radio channel 21-2). Referring to FIG. 6, while communication is performed via the lower-speed radio channel 21-1, the frame (3) is transmitted via both the communication paths (the lower-speed radio channel 21-1 and the higher-speed radio channel 21-2). At this time, if the higher-speed radio channel 21-2 is available, the ACK signal transmitted via the higher-speed radio channel 21-2 is earlier received, and thus a changeover to the higher-speed radio channel 21-2 is made to transmit subsequent frames (4) and (5). Here, if the highest speed channel is currently used, no changeover is made. When the above described function is provided, even after a changeover to the lower-speed radio channel is made due to some reason, the higher-speed radio channel can be used again.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A radio communication system transmitting and receiving data between a radio terminal and a base station control equipment via at least one communication path selected at the base station control equipment from among a plurality of communication paths having a different communication speed from each other, the radio communication system comprising:

the base station control equipment for selecting the plurality of communication paths for communicating with the radio terminal, and transmitting data frames each having the same sequence number to the radio terminal via the plurality of communication paths having been selected; and the radio terminal for receiving each of data frames transmitted from the base station control equipment through the plurality of communication paths, and sending back an ACK signal for responding to each data frame having been received through each communication path, wherein, the base station control equipment receives each of the ACK signals sent back through each communication path, and determines one of communication paths, through which the ACK signal has arrived earliest, for the communication path to transmit subsequent data frames to the radio terminal, and ignores rest of the ACK signals for the same data frame arrived later.

2. The radio communication system according to claim 1, wherein the radio terminal judges the sequence number allocated to each data frame having received through each of communication paths whether the sequence number is the first received number or already received number, and acquires the data frame having the sequence number of the first received number, and discards rest of the data frames having the sequence number of already received number.

3. The radio communication system according to claim 2, wherein the base station control equipment selects the plurality of communication paths and transmits the data frames each having the same sequence number through respective selected communication paths when the first data frame is transmitted to the radio terminal.

4. The radio communication system according to claim 2, wherein the base station control equipment selects the plurality of communication paths and transmits the data frames each having the same sequence number through respective selected communication paths periodically during the base station control equipment is communicating with the radio terminal.

5. The radio communication system according to claim 2, wherein the base station control equipment includes a time measuring unit for measuring each time interval between the data frame transmission and the ACK signal reception during communication as a retransmission timer for retransmitting same data frame when a predetermined time interval has elapsed before receiving the ACK signal, wherein the length of predetermined time interval for the retransmission timer is calculated and set based on several measurement results having been performed in time past during the communication.

6. The radio communication system according to claim 5, wherein the length of predetermined time interval for the retransmission timer is set longer in steps when every time out has been detected.

7. The radio communication system according to claim 6, wherein the base station control equipment selects the plurality of communication paths and transmits the data frames each having the same sequence number through respective selected communication paths when the time out of the retransmission timer has been detected.

8. A radio communication method for transmitting and receiving data between a radio terminal and a base station control equipment via at least one communication path selected at the base station control equipment from among a plurality of communication paths having a different communication speed from each other, the radio communication method comprising the steps of:

a path selecting step for selecting the plurality of communication paths for communicating with the radio terminal in the base station control equipment, and transmitting data frames each having the same sequence number from the base station control equipment to the radio terminal via the respective plurality of communication paths having been selected;

a data frame receiving step for receiving each of data frames transmitted from the base station control equipment through the respective plurality of communication paths in the radio terminal, and transmitting an ACK signal for responding to each data frame having been received through each communication path to the base station control equipment from the radio terminal via each communication path through which the data frame has been received; and an ACK signal receiving step for receiving each of the ACK signals sent back through each communication path in the base station control equipment, and determining one of communication paths, through which the ACK signal has arrived the earliest, for the communication path for transmitting subsequent data frames to the radio terminal from the base station control equipment, and ignoring rest of the ACK signals for the same data frame arrived later.

9. The radio communication method according to claim 8, the data frame receiving step further comprising the steps of:

a sequence number judging step for judging a sequence number allocated to each data frame having received from the base station control equipment through each of communication paths whether the sequence number is the first received number or already received number at the radio terminal; and a data frame acquiring step for acquiring the data frame having the sequence number of the first received number, and discarding rest of the data frames having the sequence number already received number at the radio terminal.

10. The radio communication method according to claim 9, wherein the path selecting step is performed when the first data frame is transmitted to the radio terminal.

11. The radio communication method according to claim 9, wherein the path selecting step is performed periodically during the base station control equipment is communicating with the radio terminal.

12. The radio communication method according to claim 9, further comprising the step of:

a time measuring step for measuring each time interval between the data frame transmission and the ACK signal reception in the base station control equipment as a retransmission timer for retransmitting same data frame when predetermined time interval has elapsed before receiving the acknowledgment signal, wherein the length of predetermined time interval for the retransmission timer is calculated and set based on several measurement results having been performed in time past during the communication.

13. The radio communication method according to claim 12, wherein the length of predetermined time interval for the retransmission timer is set longer in steps when every time out has been detected.

14. The radio communication method according to claim 12, wherein the path selecting step is performed when the time out of the retransmission timer has detected.

* * * * *